Oct. 6, 1931.  J. SZABO  1,826,582
DISTANCE DETERMINING INSTRUMENT
Filed Jan. 7, 1931  3 Sheets-Sheet 1
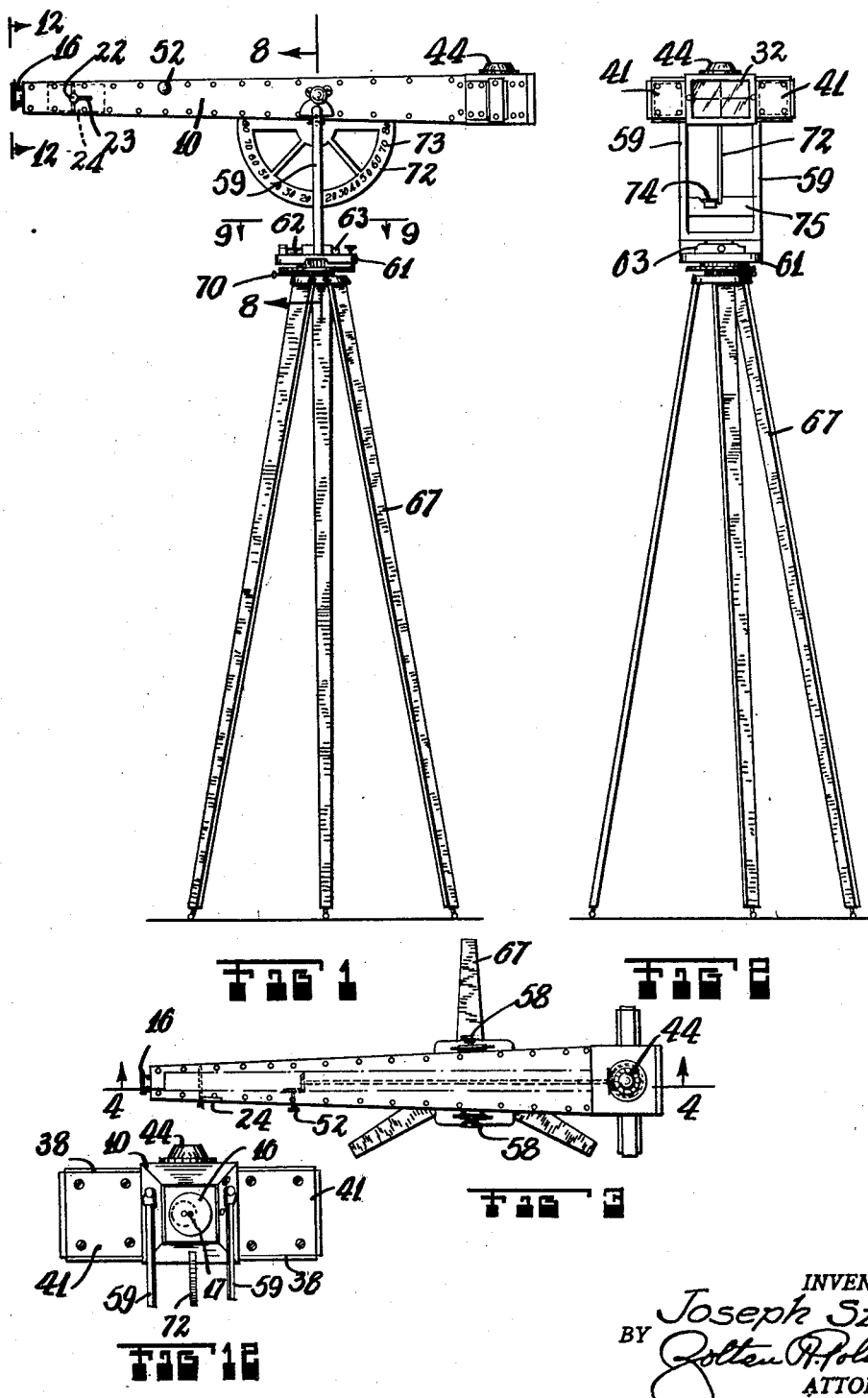
INVENTOR
Joseph Szabo
BY
ATTORNEY Oct. 6, 1931.  J. SZABO  1,826,582
DISTANCE DETERMINING INSTRUMENT
Filed Jan. 7, 1931  3 Sheets-Sheet 2
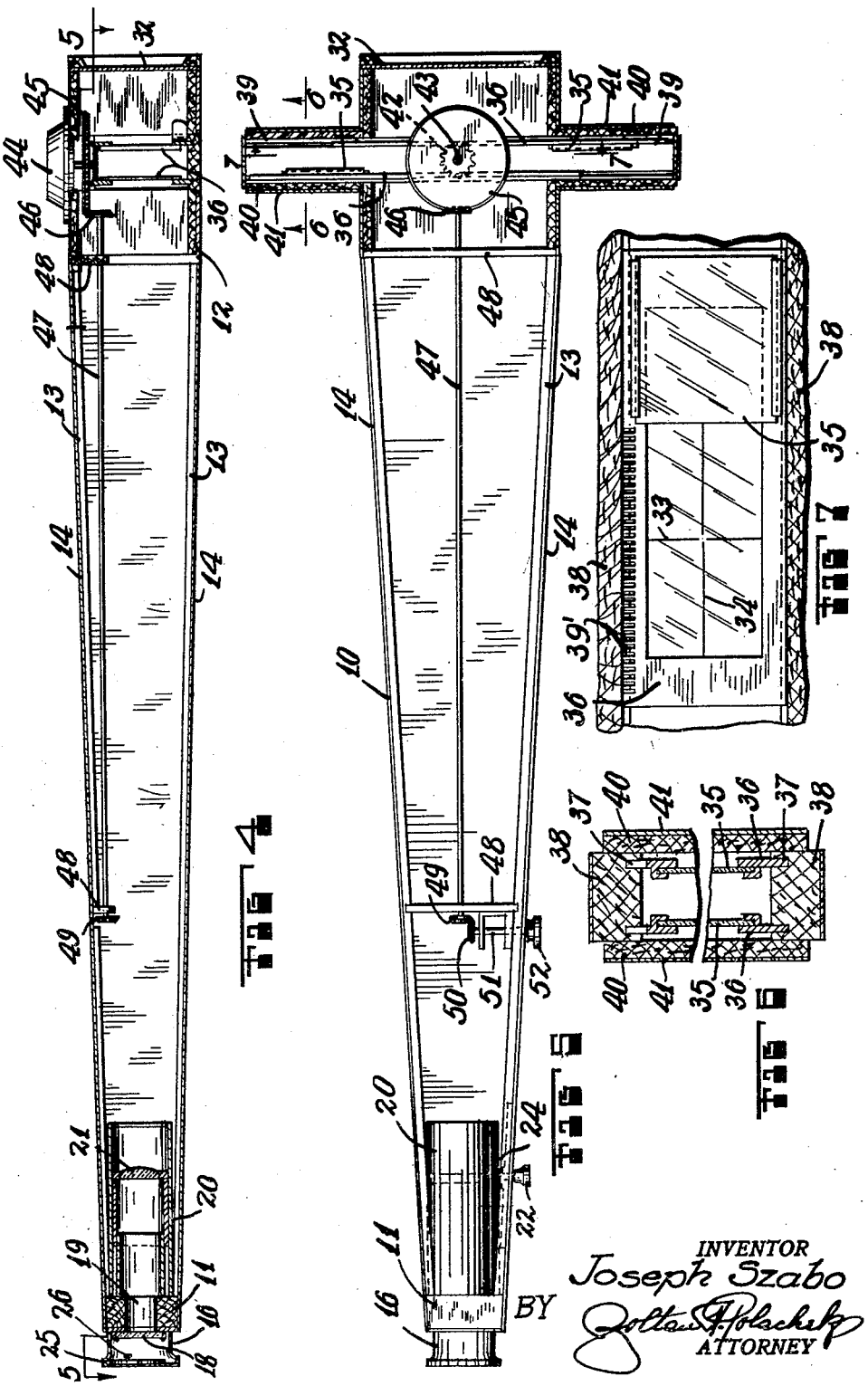
INVENTOR
Joseph Szabo
BY
Zoltan Holschek
ATTORNEY

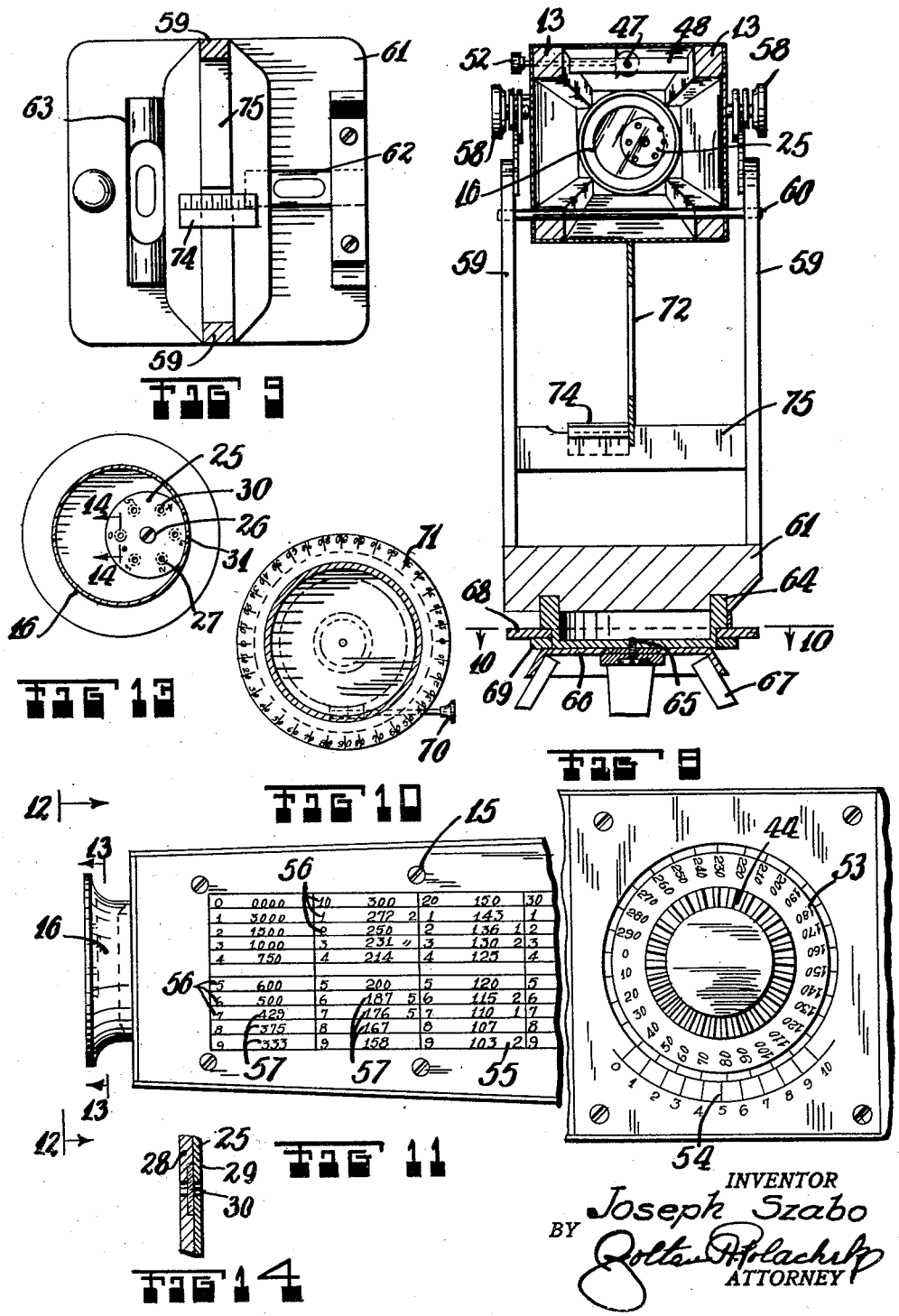

Patented Oct. 6, 1931

1,826,582

UNITED STATES PATENT OFFICE

JOSEPH SZABO, OF ASTORIA, NEW YORK

DISTANCE DETERMINING INSTRUMENT

Application filed January 7, 1931. Serial No. 507,087.

This invention relates to new and useful improvements in a distance determining instrument.

The invention has for an object the provision of a distance determining instrument which is characterized by a pair of shutters in a plane at right angles to the axis of a visor supported in the small end of a tapered casing forming a dark chamber and located immediately adjacent a window glass in the large end of the casing which has vertical and horizontal hair lines crossing on the line of the axis of said visor, said pair of shutters being arranged so as to be capable of assuming positions with adjacent edges on the vertical hair line when viewed through the visor, means for simultaneously moving said shutters apart and together, and means for accurately indicating separated positions of said shutters for obtaining a factor which is to be multiplied by the width of an object viewed through said visor and measured off by the positions of said shutters for obtaining the distance of said object to said visor.

A still further object of this invention is to include in the visor a telescopic construction so as to adapt it for focusing.

As a still further object of this invention it is proposed to pivotally support the casing, to attach a sector scale on the casing acting over a fixed scale so as to indicate deviations from the horizontal. The casing can be pivotally adjusted so as to align the horizontal hair line on the window pane before the reading of the deviation is taken.

It is a still further object of this invention to support the casing substantially horizontal upon a tripod structure. Further, a clamp should be arranged on the tripod for holding the casing in various axial positions upon the axis of the tripod.

It is a still further object of this invention to arrange side wings upon the casing to form compartments for the housing of the shutters when moved completely upwards.

As a further object of this invention it is proposed to arrange slides within the casing and side wings and supporting said shutters to allow movements.

As a still further object of this invention it is proposed to provide a means for simultaneously moving said shutters apart and together which makes use of a knob on the outer side of the casing connected with a pinion acting against rack teeth on said slides.

Another object of this invention is to provide a drive system from said pinion to the small end of the casing so that adjustments may be made from this end.

Further, it is proposed to provide a means for accurately indicating separated positions of said shutters for obtaining a factor which is to be multiplied by the width of an object viewed through said visor and measured off by the positions of the shutters for obtaining the distance of said object to the visor, which particularly makes use of a scale on the knob arranged adjacent a vernier. As a further object it is proposed to provide a shield for the visor capable of adjustments to obstruct the view with different densities of colored glass so that adjustments may be made for viewing objects eliminated to different dgrees.

It is still further proposed to arrange tables on the outside of the casing for help in obtaining the factors above mentioned without the necessity of figuring.

As a still further object of this invention it is proposed to construct a device of the class mentioned which is of simple durable construction, dependable in use and efficient in action, and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a side elevational view of a device constructed according to this invention.

Fig. 2 is an end elevational view of Fig. 1.

Fig. 3 is a plan view of Fig. 1.

Fig. 4 is an enlarged sectional view taken on the line 4—4 of Fig. 3.

Fig. 5 is a horizontal sectional view taken on the line 5—5 of Fig. 4.

Fig. 6 is a fragmentary enlarged sectional view taken on the line 6—6 of Fig. 5.

Fig. 7 is a fragmentary enlarged sectional view taken on the line 7—7 of Fig. 5.

Fig. 8 is a fragmentary enlarged transverse sectional view taken on the line 8—8 of Fig. 1.

Fig. 9 is a horizontal sectional view taken on the line 9—9 of Fig. 1.

Fig. 10 is a horizontal sectional view taken on the line 10—10 of Fig. 8.

Fig. 11 is a fragmentary enlarged detailed plan view of Fig. 1.

Fig. 12 is an elevational view looking in the direction of the line 12—12 of Fig. 11, but drawn on a reduced scale.

Fig. 13 is a transverse sectional view taken on the line 13—13 of Fig. 11.

Fig. 14 is a fragmentary enlarged sectional view taken on the line 14—14 of Fig. 13.

The device comprises a tapered casing 10 forming a dark chamber. This casing is composed of a transverse wooden block 11 at its small end, a wooden box structure 12 at its large end, a plurality of corner strips 13 connecting these parts, and sheet metal plates 14 attached down by screws 15 onto the frame structure just recited. It is requisite that the joints be made light tight so that a dark chamber is formed. The box structure 12 has its front and rear end opened so that when one looks through the small end of the casing it is possible to look out from the large end. The corner strips 13 are very clearly shown in Fig. 8 and it should be noticed that they are inclined so as to compensate for the difference in size between the large and small ends of the casing.

A visor is mounted in the small end of the casing. This visor comprises a cylindrical shell 16 attached upon the outside of the block 11 and formed with a peep aperture 17. A lens 18 is attached upon the outer side of the block 11 which is formed with an opening 19 through which one may look. A telescope 20 is attached upon the inside of the block 11 and is formed of telescoping sections, the outer one supporting a lens 21. A handle 22 is attached upon the outer telescopic section and extends through a horizontal slot 23 in the side of the casing so that the lens 21 may be focused to fit the eye of an observer. A shutter 24 is attached upon the stem which supports the handle 22 and serves to close the passage of light through the opening 23 to the interior of the casing.

A shield is also provided for the visor so as to compensate for different densities of illumination of an object being viewed. This shield is in the form of a disc 25 which is rotatively supported by a screw 26 upon the shell 16. The disc 25 is formed with a plurality of apertures 27 arranged upon the circumference of a circle so that the disc may be turned and any one of the apertures aligned with the peep aperture 17. The shown in Fig. 14, the disc 25 is formed from two layers 28 and 29. Glasses of different colors and densities 30 are mounted between the layers 28 and 29 so that upon different adjustments, the change in density before called for may be accomplished. As shown in Fig. 13, each of the glasses is provided with a different number so that the user of the device may be familiar with the different glasses. One edge of the disc 25 projects through the side of the shell 16 at the point 31 so that it is possible to manually turn the disc from the exterior of the shell.

A window glass 32 is mounted within the large end of the casing 10 and has a vertical hair line 33 and a horizontal hair line 34. These hair lines cross at a point on the line of the axis of the visor. A pair of shutters 35 are arranged in a plane at right angles with the said axis of the visor and are arranged to assume positions with their adjacent edges on the vertical hair line 33 when viewed through said visor. Each shutter 35 is attached upon a frame 36 in the form of a slide working in grooves 37 in top and bottom strips 38 mounted on the casing 10 and forming the top and bottom coverings for side wings 39. Side boards 40 complete the formation of the side wings. Each of these boards and the strips are provided with sheet metal coverings 41 so that a neat finish is had.

A means is provided for simultaneously moving said shutters 35 apart and together and comprises rack teeth 39' formed upon each of the slide frames 36 and meshing with a pinion 42 upon a stem 43 connected with a knob 44 located on the top and outer side of the casing 10. A drive system is also arranged so that the pinion 42 may be turned from the rear vicinity of the casing. This system is in the form of a bevel gear 45 attached upon the stem 43 and meshing with a bevel pinion 46 upon a spindle 47 rotatively supported in transverse elements 48 within the casing. Another bevel gear 49 is attached upon the rear end of the spindle 47 and meshes with a bevel gear 50 upon a stem 51 rotatively mounted and extending through the slide of the casing. A knob 52 is attached upon the outer end of the stem 51 for manual turning to cause the pinion 42 to turn.

A means is provided for accurately indicating separated positions of the shutters 35 for obtaining a factor which is to be multiplied by the width of an object viewed through the visor and measured off by the positions of the shutters, and comprises a scale 53 on the outside of the knob 44 acting against a vernier 54 arranged on the material adjacent the knob. It should be noticed that if the knob 44 is turned for adjusting the position of the shutters 35, or if the knob 52 is turned for the same reason, there will be a change of the reading indicating the positions of the shutter.

A table 55 is marked upon one of the sides of the casing 10, namely the top side, for use in obtaining the factor without the necessity of complicated figuring. This table is shown divided into columns composed of a front line of index members 56 and an adjacent line of factor numbers 57. For example, if the scale 53 of the vernier indicates numeral 9, then referring to scale 55 the factor which is desired is number 333. This factor is so figured out that when it is multiplied by the width of the object being viewed the desired distance will be given. The casing 10 is universally supported in a manner very similar to the various surveying instruments now on the market. More particularly, trunnions with knobs 58 project from opposite sides of the casing and rotatively engage in strips supported upon side arms 59. A transverse bar 60 serves to connect the side arms 59 with the casing 10. The side arms 59 are rigidly attached upon the bottom upon a horizontal block 61. Levels 62 and 63 are mounted upon the block 61 so that the horizontal may be obtained. These levels are arranged at right angles to each other as shown in Fig. 9, as is customary construction.

The block 61 is fixed upon a cup 64 rotatively supported by a screw 65 upon the top plate 66 of a tripod 67. Stationary discs 68 and 69 are fixed upon the top plate 66 and encircle the cup 64. The member 69 is split and the free ends provided with a clamping screw 70 so that the cup 64 may be clamped in a stationary position. A scale 71 is arranged upon the top of the member 68 so that the angle at which the cup is turned may be measured.

A means is also provided for measuring the deviations in which the casing 10 is in from the horizontal. This means is in the form of a sector 72 with a scale thereon 73. This sector is attached upon the bottom of the casing 10 and works against a stationary scale 74 mounted upon a transverse member 75 between the arms 59. The scale readings 73 and 74 may be turned to obtain the deviation mentioned.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A distance determining instrument, comprising a tapered casing forming a dark chamber, a visor in the small end of said casing, a window glass in the large end of said casing and having a vertical and horizontal hair line crossing on the line of the axis of said visor, a pair of shutters in a plane at right angles with said axis to assume positions with adjacent edges on the vertical hair line when viewed through said visor, means for simultaneously moving said shutters apart and together, and means for accurately indicating separated positions of said shutters for obtaining a factor which is to be multiplied by the width of an object viewed through said visor and measured off by the positions of said shutters for obtaining the distance of said object to said visor.

2. A distance determining instrument, comprising a tapered casing forming a dark chamber, a visor in the small end of said casing, a window glass in the large end of said casing and having a vertical and horizontal hair line crossing on the line of the axis of said visor, a pair of shutters in a plane at right angles with said axis to assume positions with adjacent edges on the vertical hair line when viewed through said visor, means for simultaneously moving said shutters apart and together, and means for accurately indicating separated positions of said shutters for obtaining a factor which is to be multiplied by the width of an object viewed through said visor and measured off by the positions of said shutters for obtaining the distance of said object to said visor, said casing comprising a frame composed of a transverse end block, a transverse end structure, corner strips between these parts, and plates secured down upon the strips, the block and the box structure.

3. A distance determining instrument, comprising a tapered casing forming a dark chamber, a visor in the small end of said casing, a window glass in the large end of said casing and having a vertical and horizontal hair line crossing on the line of the axis of said visor, a pair of shutters in a plane at right angles with said axis to assume positions with adjacent edges on the vertical hair line when viewed through said visor, means for simultaneously moving said shutters apart and together, and means for accurately indicating separated positions of said shutters for obtaining a factor which is to be multiplied by the width of an object viewed through said visor and measured off by the positions of said shutters for obtaining the distance of said object to said visor, a means being provided for shielding the view through the visor so as to compensate for the viewing of objects eliminated to different degrees.

4. A distance determining instrument, comprising a tapered casing forming a dark chamber, a visor in the small end of said casing, a window glass in the large end of said casing and having a vertical and horizontal hair line crossing on the line of the axis of said visor, a pair of shutters in a plane at right angles with said axis to assume positions with adjacent edges on the vertical hair line when viewed through said visor, means for simultaneously moving said shutters apart and together, and means for accurately indicating separated positions of said shutters for obtaining a factor which is to be multiplied by the width of an object viewed through said visor and measured off by the positions of said shutters for obtaining the distance of said object to said visor, a means being provided for shielding the view through the visor so as to compensate for the viewing of objects illuminated to different degrees, said means being in the form of a disc rotatively supported and carrying glass plates colored to different densities, and adjustable to positions in which the glass plates may be individually placed in the line of vision.

5. A distance determining instrument, comprising a tapered casing forming a dark chamber, a visor in the small end of said casing, a window glass in the large end of said casing and having a vertical and horizontal hair line crossing on the line of the axis of said visor, a pair of shutters in a plane at right angles with said axis to assume positions with adjacent edges on the vertical hair line when viewed through said visor, means for simultaneously moving said shutters apart and together, and means for accurately indicating separated positions of said shutters for obtaining a factor which is to be multiplied by the width of an object viewed through said visor and measured off by the positions of said shutters for obtaining the distance of said object to said visor, said visor including a telescope, a stem attached upon one of the telescopic members and carrying a lens, and a knob on said stem located on the exterior of the casing so that the telescopic member may be adjusted for focusing.

6. A distance determining instrument, comprising a tapered casing forming a dark chamber, a visor in the small end of said casing, a window glass in the large end of said casing and having a vertical and horizontal hair line crossing on the line of the axis of said visor, a pair of shutters in a plane at right angles with said axis to assume positions with adjacent edges on the vertical hair line when viewed through said visor, means for simultaneously moving said shutters apart and together, and means for accurately indicating separated positions of said shutters for obtaining a factor which is to be multiplied by the width of an object viewed through said visor and measured off by the positions of said shutters for obtaining the distance of said object to said visor, said visor including a telescope, a stem attached upon one of the telescopic members and carrying a lens, and a knob on said stem located on the exterior of the casing so that the telescopic member may be adjusted for focusing, said stem extending through said casing so that the knob may be located to the exterior, and a shutter being fixed upon the stem working against the slot so as to prohibit the passage of light within the casing.

7. A distance determining instrument, comprising a tapered casing forming a dark chamber, a visor in the small end of said casing, a window glass in the large end of said casing and having a vertical and horizontal hair line crossing on the line of the axis of said visor, a pair of shutters in a plane at right angles with said axis to assume positions with adjacent edges on the vertical hair line when viewed through said visor, means for simultaneously moving said shutters apart and together, and means for accurately indicating separated positions of said shutters for obtaining a factor which is to be multiplied by the width of an object viewed through said visor and measured off by the positions of said shutters for obtaining the distance of said object to said visor, said shutters being slidably mounted so as to be movable as recited.

8. A distance determining instrument, comprising a tapered casing forming a dark chamber, a visor in the small end of said casing, a window glass in the large end of said casing and having a vertical and horizontal hair line crossing on the line of the axis of said visor, a pair of shutters in a plane at right angles with said axis to assume positions with adjacent edges on the vertical hair line when viewed through said visor, means for simultaneously moving said shutters apart and together, and means for accurately indicating separated positions of said shutters for obtaining a factor which is to be multiplied by the width of an object viewed through said visor and measured off by the positions of said shutters for obtaining the distance of said object to said visor, said casing being formed with side wings in the vicinity of said shutters so that the shutters may move within these wings when fully separated.

9. A distance determining instrument, comprising a tapered casing forming a dark chamber, a visor in the small end of said casing, a window glass in the large end of said casing and having a vertical and horizontal hair line crossing on the line of the axis of said visor, a pair of shutters in a plane at right angles with said axis to assume positions with adjacent edges on the vertical hair line when viewed through said visor, means for simultaneously moving said shutters apart and together, and means for accurately indicating separated positions of said shutters for obtaining a factor which is to be multiplied by the width of an object viewed through said visor and measured off by the positions of said shutters for obtaining the distance of said object to said visor, said means for simultaneously moving said shutters apart and together comprising slidably mounted frames supporting said shutters, rack teeth in said frames, a pinion engaging said rack teeth and upon a stem connected with a knob disposed on the outside of said casing.

10. A distance determining instrument, comprising a tapered casing forming a dark chamber, a visor in the small end of said casing, a window glass in the large end of said casing and having a vertical and horizontal hair line crossing on the line of the axis of said visor, a pair of shutters in a plane at right angles with said axis to assume positions with adjacent edges on the vertical hair line when viewed through said visor, means for simultaneously moving said shutters apart and together, means for accurately indicating separated positions of said shutters for obtaining a factor which is to be multiplied by the width of an object viewed through said visor and measured off by the positions of said shutters for obtaining the distance of said object to said visor, said means for simultaneously moving said shutters apart and together comprising slidably mounted frames supporting said shutters, rack teeth in said frames, a pinion engaging said rack teeth and upon a stem connected with a knob disposed on the outside of said casing, and means for turning said pinion from the other vicinity of the casing.

11. A distance determining instrument, comprising a tapered casing forming a dark chamber, a visor in the small end of said casing, a window glass in the large end of said casing and having a vertical and horizontal hair line crossing on the line of the axis of said visor, a pair of shutters in a plane at right angles with said axis to assume positions with adjacent edges on the vertical hair line when viewed through said visor, means for simultaneously moving said shutters apart and together, means for accurately indicating separated positions of said shutters for obtaining a factor which is to be multiplied by the width of an object viewed through said visor and measured off by the positions of said shutters for obtaining the distance of said object to said visor, said means for simultaneously moving said shutters apart and together comprising slidably mounted frames supporting said shutters, rack teeth in said frames, a pinion engaging said rack teeth and upon a stem connected with a knob disposed on the outside of said casing, and means for turning said pinion from the other extremity of the casing, comprising a transmission system engaging with a bevel gear upon said stem at one end, and at the other end being provided with a knob disposed on the outside of the casing.

12. A distance determining instrument, comprising a tapered casing forming a dark chamber, a visor in the small end of said casing, a window glass in the large end of said casing and having a vertical and horizontal hair line crossing on the line of the axis of said visor, a pair of shutters in a plane at right angles with said axis to assume positions with adjacent edges on the vertical hair line when viewed through said visor, means for simultaneously moving said shutters apart and together, and means for accurately indicating separated positions of said shutters for obtaining a factor which is to be multiplied by the width of an object viewed through said visor and measured off by the positions of said shutters for obtaining the distance of said object to said visor, comprising a scale upon a knob disposed on the outside of the casing and fixed upon a stem carrying a pinion meshing with rack teeth in slides supporting said shutters.

13. A distance determining instrument, comprising a tapered casing forming a dark chamber, a visor in the small end of said casing, a window glass in the large end of said casing and having a vertical and horizontal hair line crossing on the line of the axis of said visor, a pair of shutters in a plane at right angles with said axis to assume positions with adjacent edges on the vertical hair line when viewed through said visor, means for simultaneously moving said shutters apart and together, and means for accurately indicating separated positions of said shutters for obtaining a factor which is to be multiplied by the width of an object viewed through said visor and measured off by the positions of said shutters for obtaining the distance of said object to said visor, comprising a scale upon a knob disposed on the outside of the casing and fixed upon a stem carrying a pinion meshing with rack teeth in slides supporting said shutters, and a vernier for more accurately reading said scale.

14. A distance determining instrument, comprising a tapered casing forming a dark chamber, a visor in the small end of said casing, a window glass in the large end of said casing and having a vertical and horizontal hair line crossing on the line of the axis of said visor, a pair of shutters in a plane at right angles with said axis to assume positions with adjacent edges on the vertical hair line when viewed through said visor, means for simultaneously moving said shutters apart and together, and means for accurately indicating separated positions of said shutters for obtaining a factor which is to be multiplied by the width of an object viewed through said visor and measured off by the positions of said shutters for obtaining the distance of said object to said visor, comprising a scale upon a knob disposed on the outside of the casing and fixed upon a stem carrying a pinion meshing with rack teeth in slides supporting said shutters, and a vernier for more accurately reading said scale, a table being inscribed upon the outer side of said casing for obtaining the multiplication factor desired.

In testimony whereof I have affixed my signature.

JOSEPH SZABO.